Oct. 31, 1961 C. F. BARNDT 3,006,993

VIDEO EFFECTS GENERATOR

Filed Sept. 20, 1957 3 Sheets-Sheet 1

Charles F. Barndt
INVENTOR.

BY Clarence A. O'Brien
and Harvey B. Jacobson
Attorneys

VIDEO EFFECTS GENERATOR

Filed Sept. 20, 1957 3 Sheets-Sheet 2

Charles F. Barndt
INVENTOR.

BY Clarence A. O'Brien
and Harvey B. Jacobson
Attorneys

Oct. 31, 1961 C. F. BARNDT 3,006,993

VIDEO EFFECTS GENERATOR

Filed Sept. 20, 1957 3 Sheets-Sheet 3

Charles F. Barndt
INVENTOR.

BY Clarence A. O'Brien
and Harvey B. Jacobson
Attorneys

United States Patent Office 3,006,993

Patented Oct. 31, 1961

3,006,993

VIDEO EFFECTS GENERATOR

Charles F. Barndt, 1109 Madison Lane, Alexandria, Va.

Filed Sept. 20, 1957, Ser. No. 685,271

1 Claim. (Cl. 178—7.2)

This invention relates to a video effects generator and more particularly to a device that allows two sources of video information to be controlled so that the resulting picture is a montage or mixture of the two original pictures or sources of video information.

The primary object of the present invention resides in providing the effect in a video picture as if one picture were first present and then controlled areas or holes were knocked out of the picture and a second picture were inserted in these controlled areas or holes. These areas can be of any shape and in any position in the picture. The relative shape of these areas is controlled as well as the relative size in the resultant picture as will be hereinafter described.

To carry out the invention, an electronic switching arrangement is employed. The circuit functions by using control pulses of proper polarity and phasing to control which position of each picture is allowed to pass to form the final output picture.

In the prior art the pulse former for a control signal for two video sources has usually consisted of electronic circuits which are relatively complex thus requiring considerable line-up procedure and relatively constant attention for proper adjustment. Geometric shapes of comparatively regular nature were employed, usually not easily controllable as to location in the raster, or rectangular shaped light pattern on the face of a cathode ray tube, for operating purposes. Such shapes as ellipse, crescent, star, triangle have not been practical for use in existing systems of control pulse formers. It is therefore a further and important object of the invention to provide means which will enable various geometrical shapes to be utilized for operating purposes to obtain new and unusual video effects.

These, together with various ancillary objects and features of the invention which will become apparent as the following description proceeds, are attained by this video effects generator, preferred arrangement of parts being shown in the accompanying drawings, by way of example, wherein.

The video effects generator comprising the present invention functions to allow a montage to control the shape, size and position between the pictures from two sources. The simplest consists of a "wipe" where the effect is of one picture forcing another picture off the screen with either a vertical or horizontal division between the two pictures during the process. Such a wipe can be best seen schematically in FIGURE 1.

Figure 1:
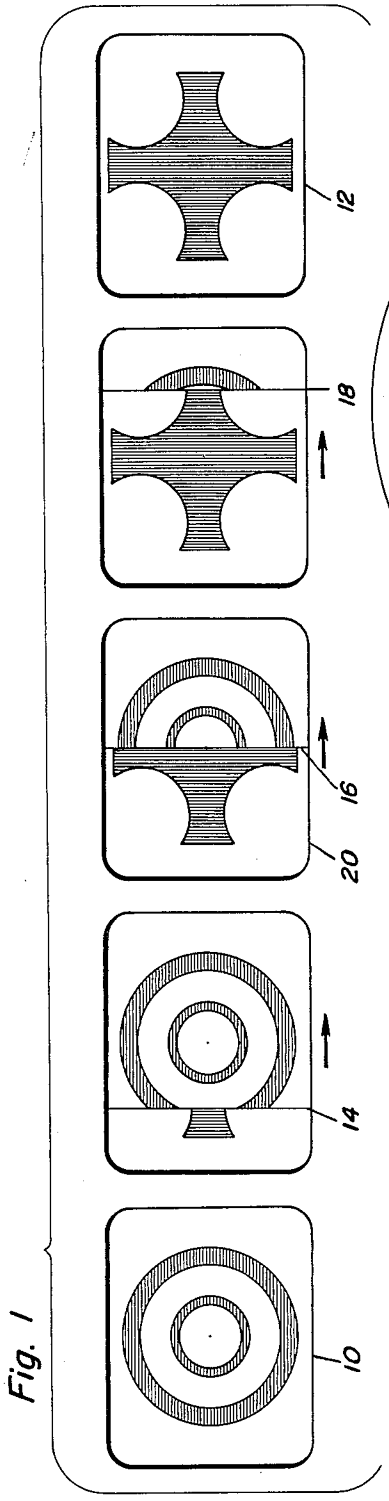
FIGURE 1 is a schematic illustration of one of the functions of the video effects generator.

In FIGURE 1, the picture as indicated at 10 is eventually replaced with the picture as indicated at 12 with the vertical line as at 14, 16 and 18 moving in a horizontal direction. If a "split screen" is used, only the condition as indicated at 20 would be used using the right half of one picture and the left half of the other. Of course, any suitable geometrical shapes can be employed.

The effect as is schematically illustrated in FIGURE 1 is created by "killing" one picture at intervals while the other picture is allowed to pass through the equipment, and vice versa. Thus the signals are keyed by an electronic switching action which is effectively a high speed single pole, double-throw switch action. This will be discussed below, with particular reference to FIGURE 1 and one of the apertures in the mask.

The switching action is electronically accomplished by the circuits that will pass one signal when a positive pulse is present at the control circuit and will pass the other when a negative pulse is present. Thus, the signal from video source 24 will be passed when there is a positive pulse present while the signal from video source 26 will pass to the output 28 when a negative pulse is present. As shown, the negative pulse is schematically at 30. Thus, it is necessary to develop pulses which are properly phased time-wise to do the switching action during the scanning time of the TV system. The invention employs means performing the control pulses with complete flexibility as to shape, size and position of a multitude of patterns.

Figures 2, 3, 4:
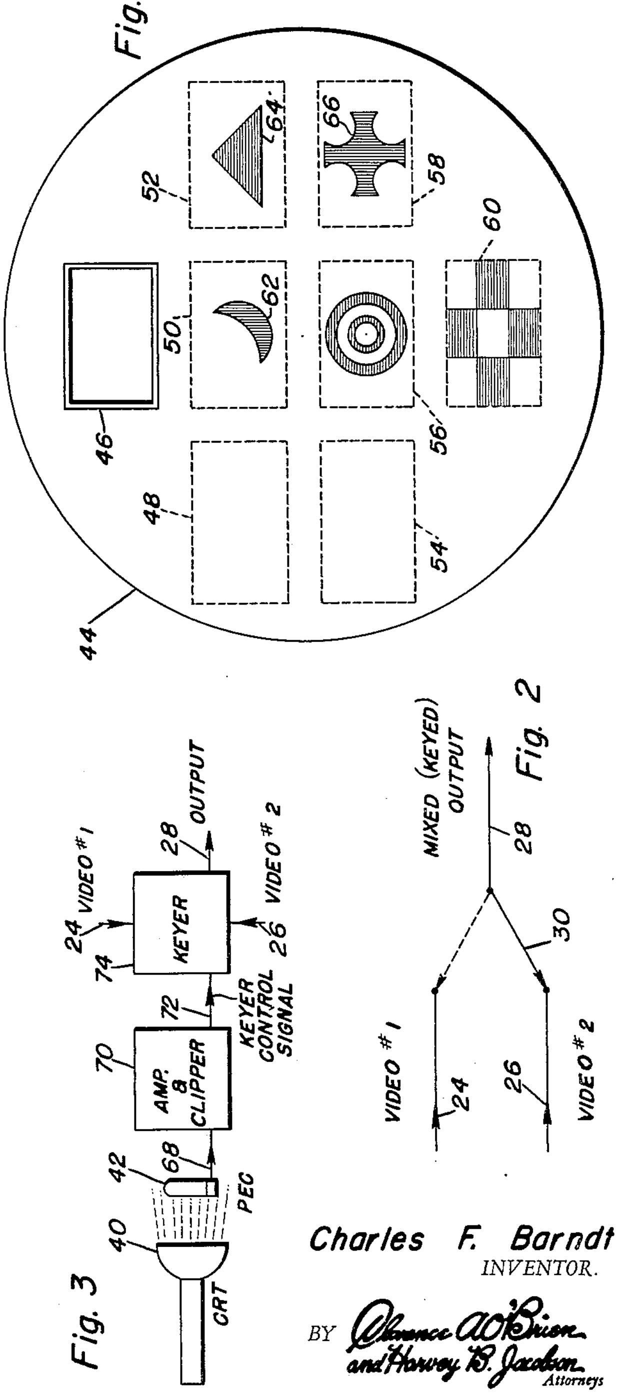
FIGURE 2 is a schematic diagram illustrating the manner in which switching occurs to provide the desired output from the two separate video sources.
FIGURE 3 is a schematic diagram of the various components utilized in the invention.
FIGURE 4 is an elevational view of one of the masks which may be utilized in the invention.

Referring to FIGURE 3, a moving spot of light is used to form a raster or rectangular shape light pattern on the face of a cathode ray tube 40. The height and width of this pattern is controlled by use of the circuits to be hereinafter described. This raster is similar to that formed on a TV receiver screen inasmuch as the spot scans in a linear fashion with time in one direction with a fast fly back, in synchronism with the TV scanning system The main difference is that the phosphor of the cathode tube 40 has a very fast decay time after scanning, in the order of several micro-seconds at the most. The light emitted from the phosphor after the electron beam has passed a spot on the face of the tube has no appreciable effect. Thus, essentially a spot of light scans an area on the screen of the tube 40. Disposed in alignment with the cathode ray tube 40 is a photo-electric cell 42. A mask 44 is preferably mounted on the cathode ray tube between the cathode ray tube and the photo-electric cell 42. FIGURE 4 shows a possible arrangement of the mask. Means are provided to shift the raster to one of the positions as indicated at 46, 48, 50, 52, 54, 56, 58 and 60. These rectangular dotted lines indicate the maximum size of the raster due to the clipping action of the electronic components of the invention to be further described, it being realized that the raster size can be reduced to any minimum size desired.

Of course the horizontal or vertical size can also be changed independently of each other allowing any desired change in the aspect ratio (ratio of height to width) of the raster, thus a comparable change in the aspect ratio of the resultant keyed shape.

As the beam moves from behind the mask light will emanate through one of the suitable openings such as indicated to be of crescent shape for example as indicated at 62, of triangular shape as at 64, of cruciform shape as at 66, or of any other suitable shape such as star shape or the like. These other shapes may be placed in the positions that are in blank as at 48 and 54 as shown.

Light passing through the mask will impinge on the face of the photo-electric cell as at 68 and passes into the amplifier and clipper as at 70 which then passes a key control signal 72 through the keyer 74.

At the keyer, the impulses from the video sources as at 24 and 26 are keyed and are delivered as the output 28.

Figure 5:
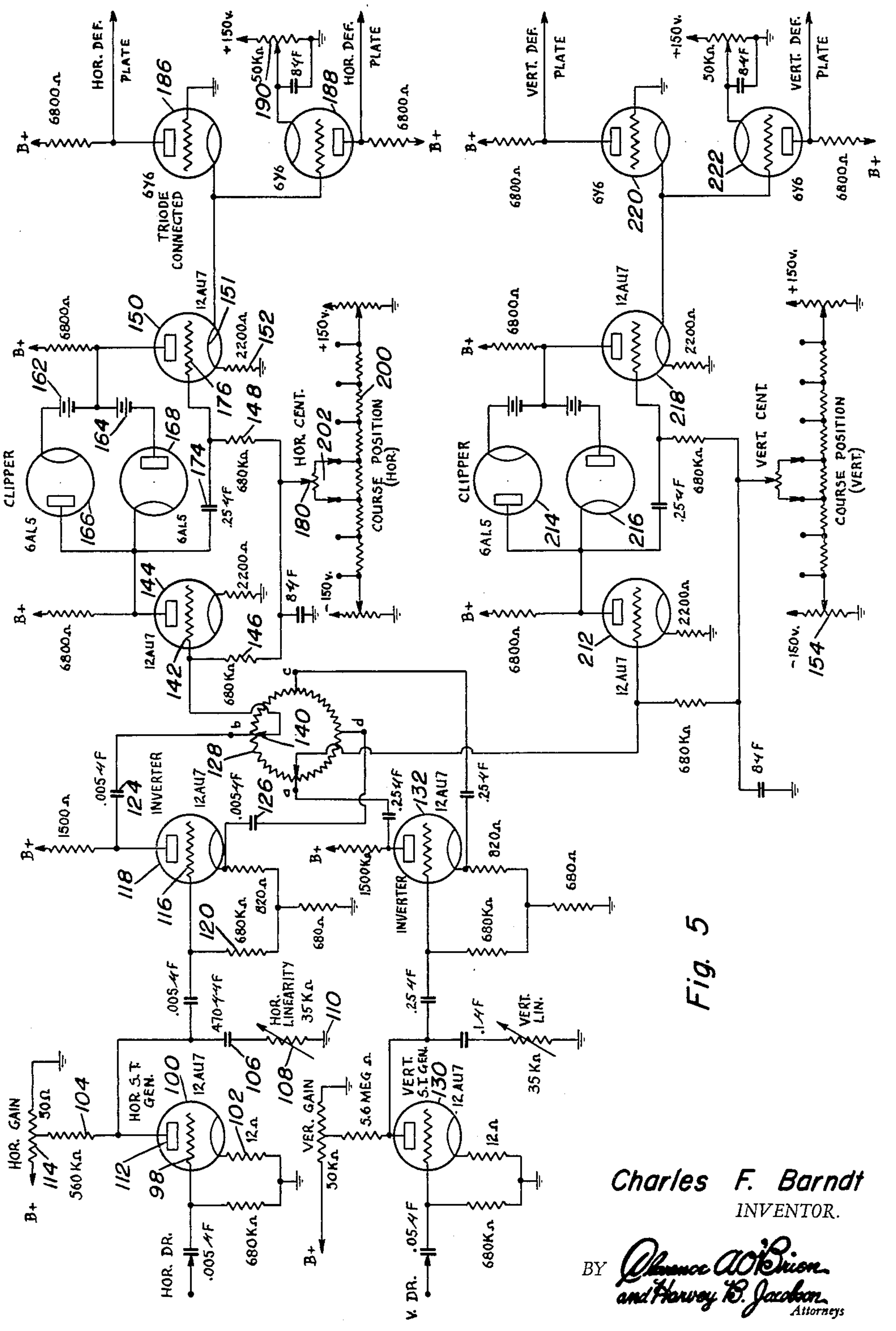
FIGURE 5 is a schematic wiring diagram of the important electrical components of the invention.

In order to understand the operation of the control circuitry of the cathode ray tube 40, attention is directed to FIGURE 5. To trace out the operation of the circuits, the grid 98 of tube 100 is fed horizontal drive pulses occurring at a line rate of 15,750 pulses per second as in the existing TV equipment and of positive polarity and roughly 10 volts amplitude. The duration of this pulse is approximately 5 micro-seconds. The grid circuit consists of a conventional coupling capacitor and grid lead for RC coupling. The cathode resistor 102 is for observing pulse shapes at this point. The plate load resistor 104 is very high and the plate supply potential is variable from zero to B plus.

During the interval when no pulse is present B plus feeds through the resistor 104 into the condenser 106 which is in series with the potentiometer 108 to ground as at 110. Thus, the condenser 106 charges at a rate controlled by the RC time constant of the combination. This is such that this charge occurs essentially at a linear rate with time. The incoming pulse appears as a negative pulse at the plate 112 and tends to discharge the condenser 106. After the pulse has appeared, the linear charge procedure occurs again. Thus, a sawtooth pulse is formed, the amplitude of which is controlled by the potentiometer as at 114 and the rate is controlled by the rate of the incoming pulse at the grid 98. The linearity potentiometer 108 controls the rate of discharge of the condenser 106 during the discharge pulse, thus controlling the portion of the charge curve used by the RC combination. This sawtooth signal is coupled through an RC coupling network to the grid 116 of tube 118. The cold end of the resistor 120 functioning as a grid leak is returned to a point in the cathode circuit for proper D.C. bias of the tube. The plate load resistor equals the sum of the series cathode resistors and thus the pulse fed the grid produces equal and opposite polarity pulses at the plate and cathode. Thus, the tube 118 serves as an inverter. These opposite sawtooths are fed through condensers as at 124 and 126 to a 360° potentiometer 128 at 180° points thereon. The condensers 124 and 126 avoid high voltage direct current at the potentiometer 128. The tubes as indicated at 130, 132 function in the same manner forming the vertical signal generator and inverter which is exactly the same except for the longer time constants of the vertical generator.

The swingers of the 360° potentiometer 128 can select either horizontal or vertical sawtooth of either polarity by swinging around to any position of the potentiometer. Usually, the two swingers would be spaced 90° apart to produce a rectangular raster at all times, but in certain special instances unusual video effects can be obtained by other positions. By rotation of both swingers while at the same time maintaining a 90° relationship between the two swingers, a rotating raster with fixed aspect ratio is obtained, thus any keyed shape can be made to rotate in the final picture; such rotation being completely controlled by the rotation of the two swingers. The sawtooth signal as at 140 is fed to the grid 142 of tube 144. The resistor 146 and 148 serve as ground returns to a variable D.C. potential for the tubes 144 and 150. The cathode resistor 152 of tube 150 is variable and is adjusted until the D.C. potentials on all elements of both tubes are the same. If necessary this adjustment could be made variable with each change in the course position of potentiometer 200. Should the course position be changed, the D.C. potential at the plates of tubes 144 and 150 are changed equally so that they are always at the same D.C. potential. An A.C. signal, however, produces plate signals 180° out of phase. As the amplitude is raised above a certain level, a clipping action occurs. This certain level is controlled by the D.C. potential of batteries 162 and 164 at the clipping diodes 166 and 168. Anything above a certain level will be fed back to tube 144 and will be cancelled out. The condenser 174 at the grid 176 of tube 150 is a blocking and coupling condenser. The signal at the cathode 151 of tube 150 causes an inverter action, D.C. coupled to the plates of tubes 186 and drives the horizontal deflection plates of the circuit. The potentiometer 190 in the cathode circuit of tube 188 maintains proper D.C. operating bias for tube 188 to match the operation of tube 186. The course position control as indicated at 200 functions to move the raster to a general position of the raster on the screen and the potentiometer 202 moves the raster in a vernier action in this area.

The operation of tubes 212, 214, 216, 218 as well as 220 and 222 function to control the vertical deflection plates in a similar manner to their corresponding tubes for controlling the horizontal deflection plates.

Figure 6:
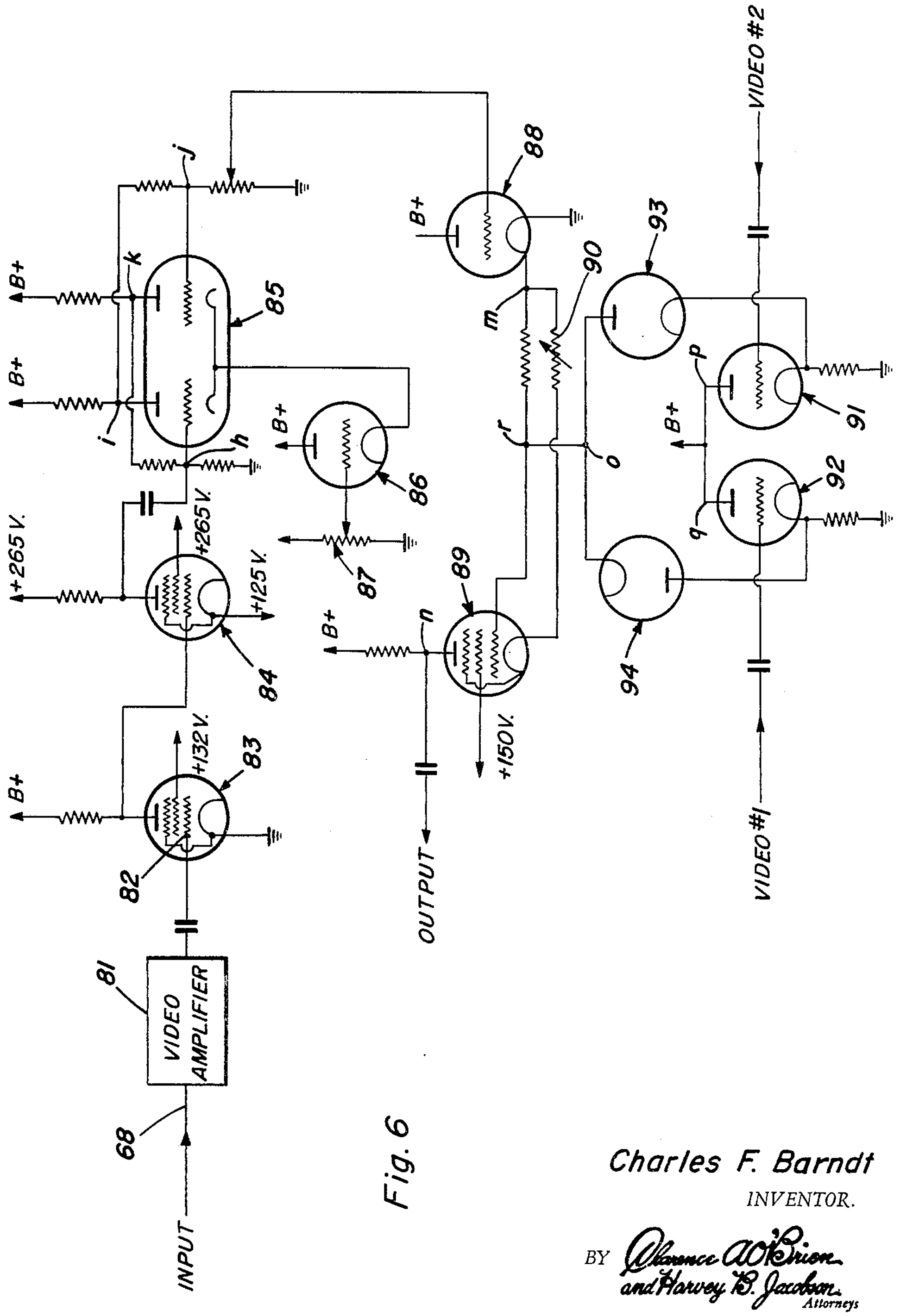
FIGURE 6 is a schematic wiring diagram of the electrical components of the electronic switching system of the invention.

In order to better understand the operation of amplifier 70 and keyer 74, shown in FIGURE 3, attention is directed to FIGURE 6. It will be observed therefrom that the output 68 feeds video amplifier 81. The output therefrom is A.C. coupled to the grid 82 of tube 83. The grid 82 is clamped during the blanking interval to re-establish the D.C. component. Tube 83 has a very sharp negative grid cut-off characteristic as well as quite a sharp saturation characteristic. The video level at the grid is high enough to drive it well into saturation and cut-off regions. The output is D.C. coupled to tube 84. Here a second clipping action occurs, except that due to 180° inversion through tube 83, grid clipping occurs in tube 84 on that portion of the signal where saturation clipping took place in tube 83. The output of tube 84 is fed to a bi-stable flip-flop tube 85. A negative surge at "*h*" causes a positive amplified pulse at "*i*," which is D.C. coupled to "*j*." This positive swing causes an amplified negative pulse at "*k*" which adds to the effect of the original negative swing. The overall effect is to continue this function until "*h*" is at grid cut-off and "*j*" is at saturation. A positive pulse causes "*h*" to swing to saturation and "*j*" to swing to cut-off. Thus tube 85 serves to decrease the rise time of the incoming square wave and to further clip the flat portions. Tube 86 and potentiometer 87 serve to provide a reference potential for the cathodes of flip-flop tube 85 for maximum stability. This signal is fed to "*k*" where it is again clamped during the blanking interval.

Tube 88 is a cathode follower which provides a low impedance source feed to junction "*m*." Here this square wave is fed to both the grid and cathode of tube 89. Potentiometer 90 is varied until no keying square wave is present at "*n*" since no difference of potential exists here due to the keying signal. Tube 91 and tube 92 are clamped cathode followers that provide low impedance source drives at "*p*" and "*q*" which are at the same potential during blanking since they are clamped to the same potential.

As "*o*" swings positive, tube 93 will conduct and video No. 2 will appear at "*r*." No video from No. 1 will be present because "*o*" is positive with respect to "*q*." As "*o*" swings negative with respect to "*p*," tube 94 will conduct and video No. 1 will be present because "*o*" is negative with respect to "*q*." This impedance of tube 94 compared to the impedance of "*o*" to ground causes essentially no loss of signal from video No. 1 at "*o*." Any capacitive inverse leakage across tubes 93 and 94 is minimized because the drive and load circuits of both are low impedance, of the order of a few hundred ohms. Thus at the output of tube 89 there is produced a video signal from two sources which is keyed by the incoming signal from the photo-electric cell 42.

Referring once again to FIGURE 1 and FIGURE 4, it can be seen that the results in FIGURE 1 can be attained by using mask 46 and moving the raster progressively behind the rectangular aperture to the left (assuming the raster is being scanned from the left to the right). At 14 the raster would be partially behind the mask, the signal during the time the spot is behind the mask keying in the cruciform picture at 16 the scanner raster is half way behind the mask etc. Further it can be seen that this dividing line between pictures could be at any angle by proper adjustment of size and rotation controls.

Thus it will be seen, signals are applied on the horizontal and vertical deflection plates which covers a system of fixed masks and moving raster for providing a montage effect from two video cameras to obtain a single composite picture providing unusual video effects. It is to be understood that a system of mechanical moving masks with a fixed raster may achieve the same or similar results by using movements achieved mechanically. Thus, for instance, an iris effect could be achieved by the raster size remaining constant and a mechanical iris changing size in front of the raster.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

A video effects generator for controlling a montage between video pictures from two separate video sources and providing a selection from a plurality of different shapes by course positioning of a raster, comprising a cathode ray tube, means for forming a raster on the phosphor of said cathode ray tube, a photoelectric cell in alignment with said cathode ray tube, a mask and a number of shapes with a selected shape between said photoelectric cell and said cathode ray tube for limiting light passing from said raster to said photo-electric tube, an amplifier for amplifying the signal emitted by said photoelectric tube connected thereto, the amplified signal passing from said amplifier serving as a control signal, a clipper connected to said amplifier to receive said control signal, an electronic switch to receive a clipped signal from the clipper, said electronic switch including two cathode follower tubes, each adapted to receive the respective input of a video signal produced by video means from different sources, two space discharge means, the cathode of one adapted to receive a signal from one cathode follower tube, and the anode of the other adapted to reecive the signal from the other cathode follower tube, the other anode and cathode, respectively, of the two space discharge means having a common junction with the clipped signal from the clipper whereby to render only one of the space discharge means conductive at a time; whereby one space discharge means will pass a signal from one video source when a positive pulse is present and the other space discharge means will pass a signal from another video source when a negative pulse is present, resulting in a montage output signal.

References Cited in the file of this patent

UNITED STATES PATENTS

| | | |
|---|---|---|
| 2,613,263 | Hilburn | Oct. 7, 1952 |
| 2,825,757 | Dennison | Mar. 4, 1958 |

FOREIGN PATENTS

| | | |
|---|---|---|
| 488,268 | Great Britain | June 30, 1938 |
| 743,402 | Great Britain | Jan. 18, 1956 |